(12) United States Patent
Kotlowski et al.

(10) Patent No.: US 7,185,128 B1
(45) Date of Patent: Feb. 27, 2007

(54) SYSTEM AND METHOD FOR MACHINE SPECIFIC REGISTER ADDRESSING IN EXTERNAL DEVICES

(75) Inventors: Kenneth J. Kotlowski, Berthoud, CO (US); Brett Tischler, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 522 days.

(21) Appl. No.: 10/714,584

(22) Filed: Nov. 14, 2003

Related U.S. Application Data (63) Continuation-in-part of application No. 09/872,518, filed on Jun. 1, 2001, now Pat. No. 6,785,758.

(51) Int. Cl.
  *G06F 13/00* (2006.01)
  *G06F 9/44* (2006.01)
(52) U.S. Cl. .......................... 710/104; 710/5; 370/351; 370/463; 712/32; 712/208
(58) Field of Classification Search ................ 710/104, 710/309, 105, 5, 33, 20, 38, 100, 305; 709/230, 709/250, 238, 253; 370/351, 416, 463, 402; 712/32, 33, 17, 28, 208; 711/2, 202, 220
See application file for complete search history.

(56) References Cited

U.S. PATENT DOCUMENTS

| 4,429,405 | A | | 1/1984 | Bux et al. |
| 4,858,112 | A | * | 8/1989 | Puerzer et al. ............... 709/230 |
| 4,965,828 | A | | 10/1990 | Ergott, Jr. et al. |
| 4,969,120 | A | | 11/1990 | Azevedo et al. |
| 5,007,011 | A | | 4/1991 | Murayama |
| 5,128,666 | A | | 7/1992 | Munier et al. |

(Continued)

FOREIGN PATENT DOCUMENTS

DE  19949144 C1  1/2001

(Continued)

OTHER PUBLICATIONS

"hierarchical system test by an IEEE 1149.5 MTM-bus slave-module interface core" by Hong et al. (abstract only) Publication Date: Oct. 2000.*

(Continued)

*Primary Examiner*—Gopal C. Ray (57) ABSTRACT

There is disclosed a bus interface unit for transferring machine specific register (MSR) requests between a plurality of bus devices. The bus interface unit comprises: 1) a plurality of input ports for receiving incoming MSR requests from the plurality of bus devices; 2) a plurality of output ports for transmitting data to the plurality of bus devices; and 3) a controller for reading N routing associated with a first received MSR request and comparing a first identification (ID) value in a predetermined M-bit field in the N routing bits to a first designated value. The controller, in response to a determination that the first ID value does not equal the first designated value: 1) realigns the N routing bits such that remaining ones of the N-M bits outside the predetermined M-bit field are moved into the predetermined M-bit field and 2) transmits the realigned N routing bits via a first one of the plurality of output ports identified by the first ID value.

24 Claims, 8 Drawing Sheets

U.S. PATENT DOCUMENTS

| | | | |
|---|---|---|---|
| 5,164,680 A | 11/1992 | Mahabadi | |
| 5,248,906 A | 9/1993 | Mahmood | |
| 5,412,786 A | 5/1995 | Kusano | |
| 5,528,172 A | 6/1996 | Sundstrom | |
| 5,539,739 A | 7/1996 | Dike et al. | |
| 5,577,102 A | 11/1996 | Koivunen | |
| 5,581,729 A | 12/1996 | Nishtala et al. | |
| 5,623,644 A | 4/1997 | Self et al. | |
| 5,634,043 A | 5/1997 | Self et al. | |
| 5,659,784 A | 8/1997 | Inaba et al. | |
| 5,694,586 A | 12/1997 | Eneboe | |
| 5,717,343 A | 2/1998 | Kwong | |
| 5,740,346 A | 4/1998 | Wicki et al. | |
| 5,796,732 A * | 8/1998 | Mazzola et al. | 370/362 |
| 5,812,875 A | 9/1998 | Eneboe | |
| 5,838,950 A * | 11/1998 | Young et al. | 703/21 |
| 5,859,550 A | 1/1999 | Brandt | |
| 5,909,594 A | 6/1999 | Ross et al. | |
| 5,933,610 A | 8/1999 | Chambers et al. | |
| 5,991,824 A | 11/1999 | Strand et al. | |
| 5,996,037 A | 11/1999 | Emnett | |
| 6,038,651 A * | 3/2000 | VanHuben et al. | 712/21 |
| 6,145,039 A | 11/2000 | Ajanovic et al. | |
| 6,185,629 B1 | 2/2001 | Simpson et al. | |
| 6,205,524 B1 | 3/2001 | Ng | |
| 6,252,865 B1 | 6/2001 | Walton et al. | |
| 6,256,693 B1 | 7/2001 | Platko | |
| 6,282,195 B1 | 8/2001 | Miller et al. | |
| 6,292,025 B1 | 9/2001 | Okumura | |
| 6,333,654 B1 | 12/2001 | Harris et al. | |
| 6,335,935 B2 | 1/2002 | Kadambi et al. | |
| 6,353,867 B1 | 3/2002 | Qureshi et al. | |
| 6,370,616 B1 * | 4/2002 | Callison et al. | 711/114 |
| 6,415,344 B1 * | 7/2002 | Jones et al. | 710/105 |
| 6,415,361 B1 | 7/2002 | Moh et al. | |
| 6,415,424 B1 | 7/2002 | Arimilli et al. | |
| 6,418,497 B1 | 7/2002 | Guthrie et al. | |
| 6,477,174 B1 | 11/2002 | Dooley et al. | |
| 6,504,817 B2 | 1/2003 | Oldfield et al. | |
| 6,553,446 B1 | 4/2003 | Miller | |
| 6,578,098 B1 | 6/2003 | Meiyappan et al. | |
| 6,581,116 B1 | 6/2003 | Arimilli et al. | |
| 6,584,101 B2 | 6/2003 | Hagglund et al. | |
| 6,611,893 B1 * | 8/2003 | Lee et al. | 710/309 |
| 6,700,401 B2 | 3/2004 | Lapidus | |
| 6,763,448 B1 * | 7/2004 | Mitsuishi | 712/39 |
| 7,062,632 B2 * | 6/2006 | Freiwald et al. | 711/212 |
| 2002/0053004 A1 | 5/2002 | Pong | |
| 2002/0110120 A1 | 8/2002 | Hagglund et al. | |
| 2002/0118041 A1 | 8/2002 | Lapidus | |
| 2002/0120878 A1 | 8/2002 | Lapidus | |
| 2002/0126693 A1 | 9/2002 | Stark et al. | |

FOREIGN PATENT DOCUMENTS

| | | |
|---|---|---|
| JP | 410285011 A | 10/1998 |

OTHER PUBLICATIONS

Tanenbaum, Andrew S., "Structured Computer Organization," Prentice-Hall, 2$^{nd}$ Ed., pp. 10-12, 1984.

Calder, B and Grunwald, D., "Fast and Accurate Instruction Fetch and Branch Prediction," Computer Architecture, Proceedings the 2nd Annual International Symposium on, 1 pp, Apr. 18-21, 1994.

John P. Uyemura, "CMOS Logic Circuit Design," Kluwer Academic Publishers, Boston, MA; ISBN 0-7923-8452-0, pp. 144 & 145, 2001.

Wee-Seng Soh and Kim, H.S., "Dynamic bandwidth reservation in hierarchical wireless ATM networks using GPS-based prediction," IEEE VTS 50th Vehicular Technology Conference, Amsterdam, Netherlands, on pp. 428-432 vol. 1, [online] Retrieved from IEEE Xplore, Abstract, 2 pages, Sep. 19, 1999.

Polze, A. et al., "Predictable Network Computing," Proceedings of the 17th International Conference on Distributed Computing Systems, Baltimore, MD, on pp. 423-431, [online] Retrieved from IEEE Xplore, Abstract, 2 pages, May 27, 1997.

* cited by examiner

SYSTEM AND METHOD FOR MACHINE SPECIFIC REGISTER ADDRESSING IN EXTERNAL DEVICES

CROSS-REFERENCE TO RELATED APPLICATIONS

The present invention claims priority to U.S. patent application Ser. No. 09/872,518, filed on Jun. 1, 2001, now U.S. Pat. No. 6,785,758 entitled, "SYSTEM AND METHOD FOR MACHINE SPECIFIC REGISTER ADDRESSING IN A SPLIT TRANSACTIONAL UNIDIRECTIONAL BUS ARCHITECTURE."

The present invention is related to those disclosed in the following United States Patent Applications:

1. Ser. No. 09/796,328, filed on Feb. 28, 2001, entitled "INTEGRATED CIRCUIT HAVING PROGRAMMABLE VOLTAGE LEVEL LINE DRIVERS AND METHOD OF OPERATION"; and
2. Ser. No. 09/796,660, filed on Feb. 28, 2001, entitled "REDUCED NOISE LINE DRIVERS AND METHOD OF OPERATION";
3. Ser. No. 09/845,504, filed on Apr. 30, 2001, entitled "SPLIT TRANSACTIONAL UNIDIRECTIONAL BUS ARCHITECTURE AND METHOD OF OPERATION"; and,
4. Ser. No. 09/845,455, filed Apr. 30, 2001, entitled "BUS ARBITRATOR SUPPORTING MULTIPLE ISOCHRONOUS STREAMS IN A SPLIT TRANSACTIONAL UNIDIRECTIONAL BUS ARCHITECTURE AND METHOD OF OPERATION."

The above applications are commonly assigned to the assignee of the present invention. The inventions of these related patent applications are hereby incorporated by reference for all purposes as if fully set forth herein.

TECHNICAL FIELD OF THE INVENTION

The present invention is generally directed to system-on-a-chip (SOC) devices and other large integrated circuits (ICs) and, in particular, to a high-throughput bus architecture for use in a SOC device or other large integrated circuit (IC).

BACKGROUND OF THE INVENTION

In recent years, there have been great advancements in the speed, power, and complexity of integrated circuits, such as application specific integrated circuit (ASIC) chips, random access memory (RAM) chips, microprocessor (uP) chips, and the like. These advancements have made possible the development of system-on-a-chip (SOC) devices. A SOC device integrates into a single chip all (or nearly all) of the components of a complex electronic system, such as a wireless receiver (i.e., cell phone, a television receiver, and the like). SOC devices greatly reduce the size, cost, and power consumption of the system.

However, SOC designs are pushing the limits of existing interconnect topologies and diagnostic capabilities. Many SOC devices, including microprocessors, use a variety of shared tri-state buses (e.g., XBus, fast XBus, PCI, and fast PCI). Currently there are no standard bus topologies and no easy way to mix and match designs for quick integration. In addition, with no consistent bus model, there are no consistent debugging, power management, or validation standards. The existing bus topologies are not scalable and do not support the demanding needs for higher bandwidth, isochronous data, and scalable peripherals.

These problems stem, in part from the lack of a standard interconnect for high-performance devices, such as the central processing unit (CPU) or processor core, 2D/3D graphics blocks, MPEG decoding blocks, 1394 bus, and the like. As device requirements exceed existing bus capabilities, either new derivative buses are created or non-Universal Memory Architecture (non-UMA) solutions are used. These ad-hoc non-standard interfaces preclude the reuse of technology improvements between products.

Another weakness in current bus topologies is the lack of a generalized UMA interface. Allowing multiple devices to use the same unified memory reduces system cost. However, the UMA devices must not adversely effect the processor access latency. Another limitation in many data processing devices is the chip-to-chip peripheral connection interface (PCI) bus. Using a chip-to-chip PCI bus limits bandwidth and the possibility of implementing chip-to-chip UMA devices.

Existing bus architectures do not support technology reuse as memory bandwidth increases with new memory speeds and technologies (e.g., SDRAM-166). A new bus standard must support bandwidth matching between older, lower bandwidth devices and newer, higher bandwidth devices. In addition to bandwidth matching, clock matching must be addressed when mixing bus architectures.

New input/output (I/O) standards, such as 1394 and USB, create real-time isochronous data streams which need guaranteed bandwidths and latencies. Most bus topologies do not adequately support these isochronous requirements. Mixing isochronous data, low latency access, and high-bandwidth UMA peripherals requires a new full-featured bus topology.

Peer-to-peer communication is optimal for data streams such as VIP, 1394 and MPEG transport layer. Using peer-to-peer, memory and CPU interactions can be avoided. In addition, data traffic between the CPU and a graphics rendering block requires high bandwidth peer-to-peer communication.

Still another weakness in current bus topologies is the manner in which machine specific register (MSR) requests are handled by bus interface (IF) units in a bus architecture. In order to transfer a MSR Read request or MSR Write request from a master bus device to a slave bus device, each bus IF unit between the master and slave bus devices requires complex address translation circuitry to correctly route the MSR request. Typically, address maps are used to identify the location of the slave bus device. This requires that each bus IF unit be configured by an external device, such as the CPU core or the master bus device, according to the bus topology in which the bus IF unit is established.

Therefore, there is a need in the art for an improved bus architecture for system-on-a-chip (SOC) devices and other large scale integrated circuits. In particular, there is a need for a bus architecture that implements a simplified MSR processing capability. More particularly, there is a need for a bus architecture in which bus interface units do not need to be configured by external devices in order to handle MSR requests.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processing system.

Figure 1:
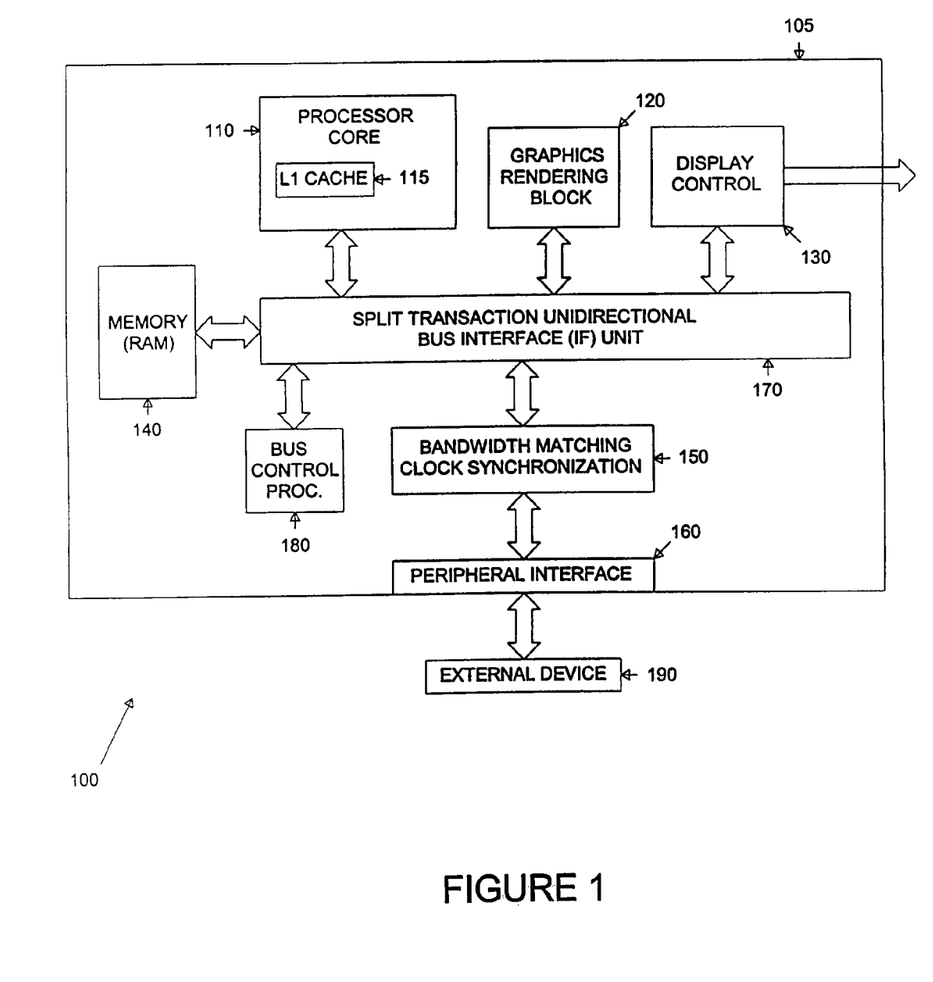
FIG. 1 illustrates a data processing system that comprises an exemplary system-on-a-chip (SOC) device according to one embodiment of the present invention.

FIG. 1 illustrates processing system 100, which comprises exemplary system-on-a-chip (SOC) device 105 according to one embodiment of the present invention. SOC device 105 is a single integrated circuit comprising processor core 110, graphics rendering block 120, (optional) display control circuit 130, memory 140, bandwidth matching-clock synchronization interface 150, peripheral interface 160, split transaction, unidirectional bus interface (IF) unit 170 (or bus IF unit 170), and bus control processor 180. Optionally, processor core 110 may contain internal level one (LI) cache 115. Peripheral interface 160 communicates with external device 190.

Processing system 100 is shown in a general level of detail because it is intended to represent any one of a wide variety of electronic products, particularly consumer appliances. Display controller 130 is described above as optional because not all end-products require the use of a display. Likewise, graphics rendering block 120 may also be optional.

For example, processing system 100 may be a printer rendering system for use in a conventional laser printer. Processing system 100 also may represent selected portions of the video and audio compression-decompression circuitry of a video playback system, such as a videocassette recorder or a digital versatile disk (DVD) player. In another alternative embodiment, processing system 100 may comprise selected portions of a cable television set-top box or a stereo receiver.

Bus IF unit 170 provides high-speed, low latency communication paths between the components coupled to bus IF, unit 170. Each component coupled to bus IF unit 170 is capable of initiating or servicing data requests via four unidirectional bus interfaces: two request buses and two data buses. The request bus contains address lines, byte enable lines (32-bit or 64-bit data reads), cycle type lines, and routing information for transactions. The data bus contains data lines, byte enable lines (for data writes), completion status lines, and routing information to associate the data bus packets with the appropriate request bus packet. As noted, the four buses are unidirectional and point-to-point to minimize loading and timing variations. In addition, bus IF unit 170 provides a diagnostic bus, power management controls, clocks, reset signals, and a scan interface.

Bus IF unit 170 implements a transaction protocol that defines the mechanism for transferring packets between devices coupled to bus IF unit 170. In addition, the transaction protocol defines the control for clocks and power management. The packet protocol standardizes the system level interactions between devices coupled to bus IF unit 170. The hardware requirements for translating addresses, arbitrating packets, and maintaining coherency are specified in the packet protocol.

Bandwidth matching-clock synchronization interface 150 comprise a queue that bridges ports on bus IF unit 170 that have different widths or different frequencies, or both. Bus control processor 180 controls certain operations of bus IF unit 170 related to clock timing, power management, and diagnostic features. Peripheral interface 160 is a bus device used for chip-to-chip communication between SOC device 105 and an external peripheral device, such as external device 190.

Figure 2:
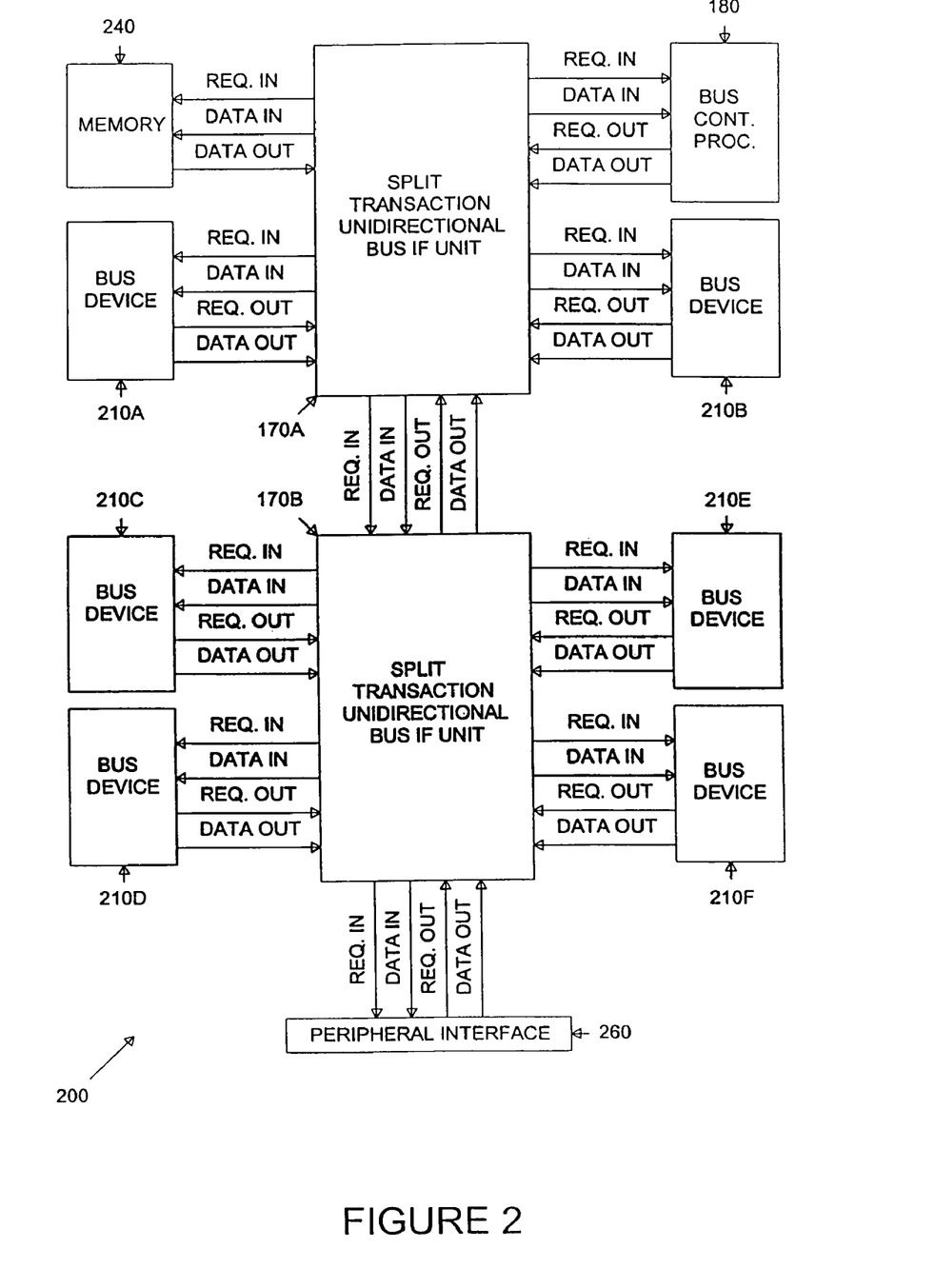
FIG. 2 illustrates a high-level signal interface of the interconnection of exemplary split transaction, unidirectional bus interface (IF) unit and other bus devices in FIG. 1 according to the principles of the present invention.

FIG. 2 illustrates high-level signal interface 200, which defines the interconnection of an exemplary split transaction, unidirectional bus interface (IF) unit and other bus devices in FIG. 1 according to the principles of the present invention. In the illustrative embodiment, a first split transaction, unidirectional bus interface unit (i.e., bus IF unit 170A) is coupled to, and transfers data between, memory 240, bus control processor 180, bus device 210A, bus device 21 OB, and a second split transaction, unidirectional bus interface unit (i.e., bus IF unit 170B). Bus IF unit 170B is coupled to, and transfers data between, bus devices 210C–210F, peripheral interface 260, and bus IF unit 170A.

In the illustrative embodiment, bus IF unit 170A uses separate interfaces to transfer data with bus device 210A, bus device 210B, bus control processor 180, and bus IF unit 170B. Each of the separate interfaces comprises four unidirectional buses. The unidirectional buses in each interface are REQUEST OUT, REQUEST IN (abbreviated REQ. OUT and REQ. IN, respectively), DATA OUT, and DATA IN. Similarly, bus IF unit 170B uses separate interfaces to transfer data with bus devices 210C–210F., peripheral interface 260, and bus IF unit 10A.

A data read request from a requesting one of bus devices 210A–210F is transmitted from bus IF unit 170A or bus IF unit 170B to a receiving one of bus devices 210A–210F that has the requested data via one of the REQUEST IN buses. The requested data is then transmitted out on the corresponding DATA OUT bus and received by the requesting device on its DATA IN bus. Similarly, a write request from a requesting one of bus devices 210A–210F is transmitted from bus IF unit 170A or bus IF unit 170B to a receiving one of bus devices 210A–210F to which the data is to be written via one of the REQUEST IN buses. The incoming data is then received on the corresponding DATA IN bus. A requesting one of bus devices 210A–210F transmits read and write requests on the REQUEST OUT bus.

For example, bus device 210A may write data to bus device 210B by first transmitting to bus IF unit 170A a write data request on the REQUEST OUT bus coupling bus device 210A and bus IF unit 170A. Bus device 210A also transmits the write data (i.e., data being written) to bus IF unit 170A on the DATA OUT bus coupling bus device 210A and bus IF unit 170A. Next, bus IF unit 170A transmits the write data request to bus device 210B on the REQUEST IN bus coupling bus device 210B and bus IF unit 170A. Bus IF unit 170A also transmits the write data to bus device 210B on the DATA IN bus coupling bus device 210B and bus IF unit 170A.

Furthermore, a bus device coupled to bus IF unit 170A can read data from, or write data to, a bus device coupled to bus IF unit 170B. (including peripheral interface 260) via the four bus interface connecting bus IF unit 170A and bus IF unit 170B. Similarly, a bus device coupled to bus IF unit 170B (including peripheral interface 260) can read data from, or write data to, a bus device coupled to bus IF unit 170A via the four bus interface connecting bus IF unit 170A and bus IF unit 170B.

In the exemplary embodiment in FIG. 2, bus IF unit 170A is coupled to memory 240 by only three buses, namely the REQUEST IN bus, the DATA OUT bus, and the DATA IN bus. A REQUEST OUT bus is not used to couple bus IF unit 170A and memory 240 because memory 240 does not normally initiate read operations and write operations.

Figure 3:
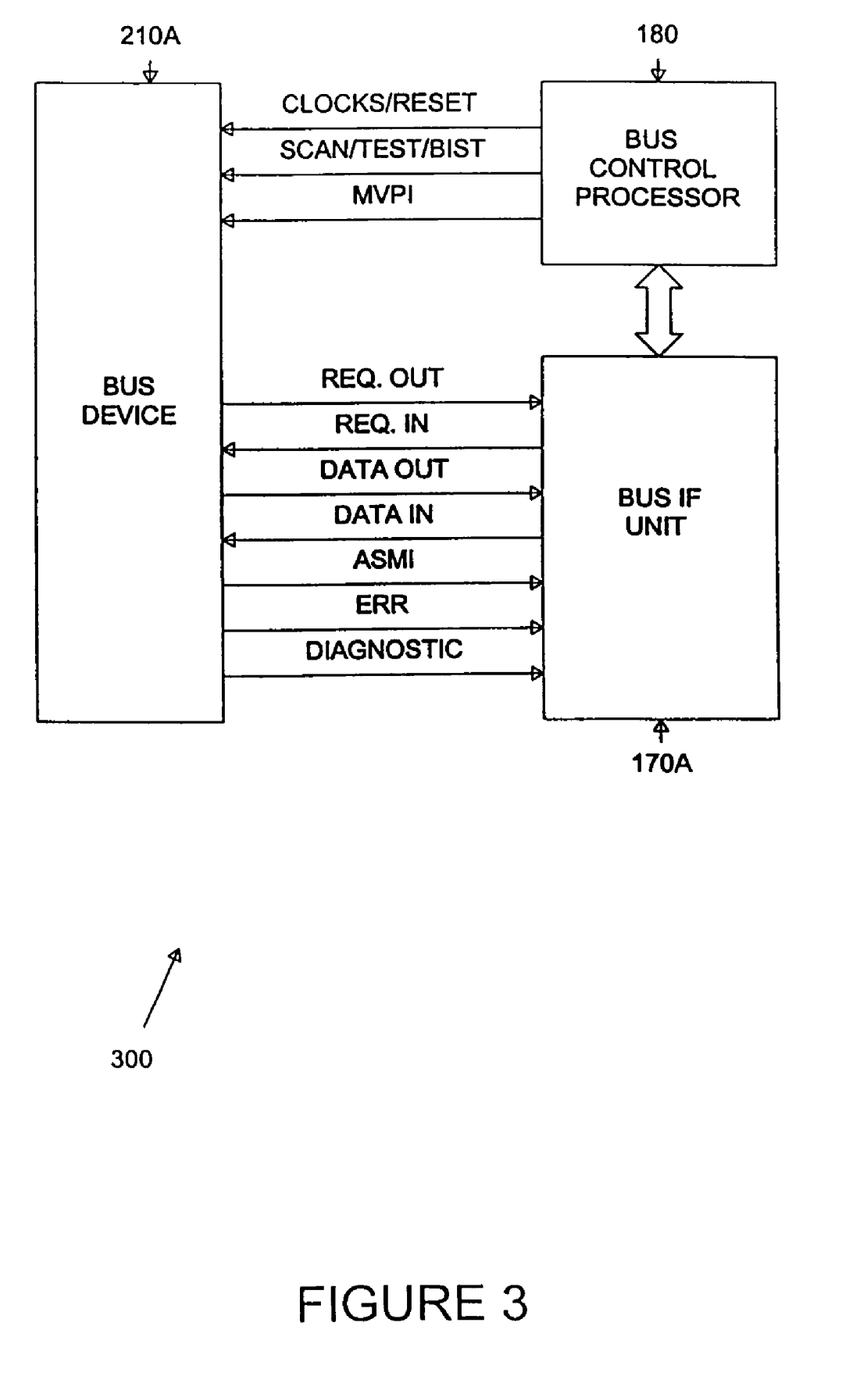
FIG. 3 illustrates the signal interface which defines the interconnection of the exemplary bus IF unit, bus control 1 processor, and one bus device in FIG. 2 in greater detail according to one embodiment of the present invention.

FIG. 3 illustrates in greater detail exemplary signal interface 300, which defines the interconnection of bus IF unit 170A, bus control processor 180, and bus device 210A according to one embodiment of the present invention. As before, bus IF unit 170A is coupled to bus device 210A by four independent buses (REQUEST OUT, REQUEST IN, DATA OUT, and DATA IN). Bus IF unit 170A also is coupled to bus device 210A by several control signal lines, namely ASMI, ERR, and DIAGNOSTIC. Each port has an independent interface. Thus, there are no tri-state signal lines.

Bus device 210A initiates requests on the REQUEST OUT bus when bus device 210A operates as a master and receives requests on the REQUEST IN bus when bus device 210A operates as a slave . . . Write data and responses are initiated on the DATA OUT bus and transmitted to the target bus device (master or slave) on the DATA IN bus. All of the buses have a similar control interface. The data bus width (e.g., 16 bits, 32 bits, etc.) may vary based on the bandwidth desired for a given application. The asynchronous system management interrupt (ASMI) signal provides a mechanism for bus device 210A to request a system management interrupt. The error (ERR) signal indicates an error that is not associated with a particular bus transfer.

Bus device 210A receives clock and reset (CLOCK/RESET) signals from bus control processor 180. Bus control processor 180 also provides control signals for performing scan, test, and/or built-in self test (BIST) functions. Optionally, bus device 210A may provide a DIAGNOSTIC bus that is coupled to bus IF unit 170A. The DIAGNOSTIC bus is a group of important internal signals selected by the module designer. The DIAGNOSTIC bus may be multiplexed with diagnostic buses from other bus devices in bus IF unit 170A.

Request Bus Arbitration—The bus IF unit 170 arbitration scheme provides controlled latencies for real-time and isochronous data streams while maintaining optimal memory controller efficiency. The arbitration uses priority levels, time-slicing and round robin arbitration to meet these goals. The arbitration unit performs a series of tests until one possible request is remaining., In an advantageous embodiment of the present invention, bus IF unit 170 arbitrates one request/cycle. There is no arbitration overhead when switching between master bus devices 210. Therefore, if a graphics request is arbitrated, the next cycle can be arbitrated to the CPU. Specifically, the order of arbitration tests is as follows:

1) source/destination ready;
2) data coherency ordering rules;
3) time slice (isochronous data);
4) priority;
5) back-to-back requests; and
6) round-robin.

Source/Destination Ready Test—For each possible master bus device 210, if master bus device 210 has a request and the destination of the request is available, then the request may be arbitrated.

Data Coherency Ordering Rules Test—The number of outstanding transactions and the current slave bus device 210 for each possible master bus device 210 are checked to prevent ordering hazards. If the request satisfies all the ordering checks, then it may be arbitrated.

Time Slice Arbitration Test—Time slice arbitration allows low-bandwidth isochronous devices to obtain service at fixed time intervals. Bus devices 210 are not required to use time slice arbitration. The mechanism is based on a "time slice wheel," which is a free-running rollover counter. Each bus device 210 that is participating in the time-slice arbitration scheme is assigned a time-slice of counter values. If multiple bus devices in the system require time-slice arbitration, bus devices can be assigned to different time slices to avoid conflicts.

The time slice wheel guarantees an arbitration slot for bus devices 210 requesting at the time-slice priority level 4 (highest priority level). If master bus device 210 issues a request and i) the source identification (SID) for master bus device 210 is assigned to the current time-slice and ii) master bus device 210 has not had a request acknowledged during the time-slice, then master bus device 210 is guaranteed to win the arbitration. If slave bus device 210 is not ready, it is guaranteed to be ready at least once during the period of the time slice. If master bus device 210 changes flow to a different slave bus device 210, then the request can be stalled and isochronous/real-time data streams can not be guaranteed.

The time slice wheels between multiple bus IF units 170 must be programmed in a consistent manner. The time slice wheels in all of bus IF units 170 are synchronized.

Priority Test—The master bus devices with the highest priority level (0–3) may be arbitrated.

Round Robin Test—Arbitration fairness within a priority level is maintained using round robin arbitration to allow all devices fair access to the memory or other slave devices.

Data Bus Arbitration—Read response and write response packets are prioritized above write data packets. If there are multiple response packets or write data packets, then priority is based on port order. The lower number ports are prioritized above the higher number ports. Since Port 1 is the lowest available port number (Port 0 is a register within bus IF unit 170), data on Port 1 is never denied arbitration. Therefore, a bus device on Port 1 does not need response buffers in case a response data packet is not arbitrated.

Slave bus devices 210 that are capable of queuing multiple requests must contain a mechanism to elevate the priority of queued requests. This mechanism looks at the priority field of incoming requests. Slave bus device 210 determines a unique master bus device 210 from the combination of the device source identification (SID) and the device priority domain identification (PID) fields. The slave bus device compares the SID and PID fields to the requests in its queue. If the slave bus device finds a match on both of these fields and the priority field of the incoming request is higher than the priority fields of the matching requests in the queue, the priority of the requests in the queue are set to the value of the priority of the incoming packet. This ensures that the transactions from a given master bus device complete in order.

If a master bus device wishes to elevate the priority of previously sent (pending) requests but is unable to begin a new transaction, the master bus device may issue a null request at the higher priority level. Bus IF unit 170 then routes the null-request packet to the same slave bus device as the previous request from that master bus device. Upon receipt of a null request, a slave bus device updates the priority of queued transactions as described above and then discards the null request packet. Slave bus devices do not send a data packet in response to a null request. A bus device cannot elevate its priority to level 4, which is the time slice priority.

The CPU interface may implement a watchdog timer to ensure that it is able to receive service in the system in case of a catastrophic error or hardware malfunction. The watchdog timer increments during each clock in which the CPU has a pending transaction. It resets each time the CPU receives a response to a previously issued request. If the timer expires, the CPU elevates its priority level to highest priority to guarantee completion. This allows the CPU some portion of bus bandwidth, even if an errant device is consuming a high amount of bus bandwidth at the highest priority level. Optionally, other bus devices in the system may be permitted to implement a watchdog timer.

Figure 4:
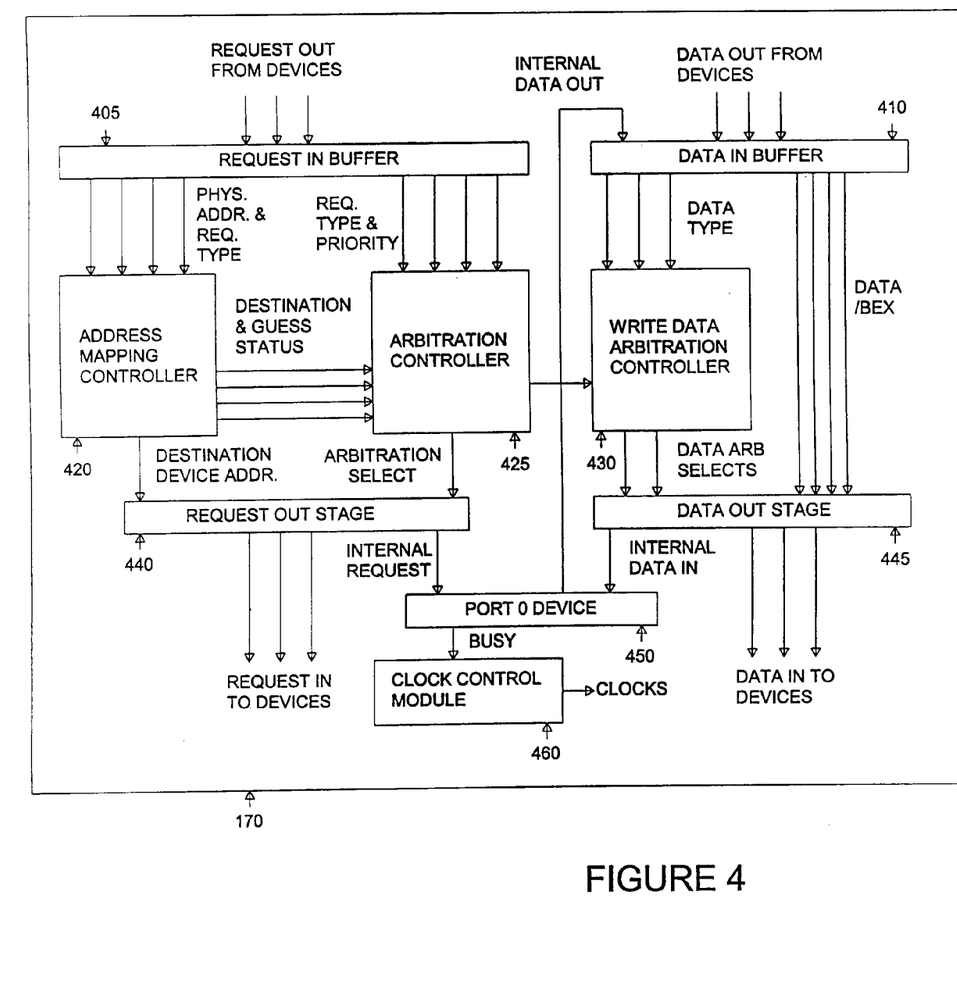
FIG. 4 illustrates an exemplary split transaction, unidirectional bus interface (IF) unit in greater detail according to the principles of the present invention.

FIG. 4 illustrates in greater detail exemplary split transaction, unidirectional bus interface (IF) unit 170 (bus IF unit 170) according to the principles of the present invention. Bus IF unit 170 comprises request-in buffer 405, data-in buffer 410, address mapping controller 420, arbitration controller 425, write data arbitration controller 430, request-out stage 440, data-out stage 445, Port 0 device 450, and clock control module 460.

Request-In Buffer 405—Request-in buffer 405 receives incoming requests from bus devices 210. In one embodiment of the present invention, a one-clock turnaround is present before the request-in buffer 405 acknowledges acceptance of the request packet. In order to operate with this one-clock delay, the request-in buffer 405 uses a I-entry buffer for each master bus device port. Request-in buffer 405 manages this buffer and places either the incoming request or the buffered request on the internal request bus. The internal request bus has all of the packet fields parsed (e.g., request type, physical address, priority). In addition, the request-in buffer 405 replaces the incoming SID with the actual port number of the device. The request-in buffer 405 sends the physical address and request type fields to address mapping controller 420 and the request type and priority fields to arbitration controller 425. The other fields are forwarded to request-out stage 440 module. Request-in buffer 405 also implements a port active enable signal to limit the request activity of each port. The port active enable signal is used to prevent a bus device from performing any transactions during configuration and limiting the priority and number of outstanding requests from misbehaving bus devices. In addition, if the bridge feature is enabled for the port, registered inputs are implemented. This provides a full cycle when crossing bus IF units 170. This is important for timing purposes because two bus IF units 170 that are coupled together may be disposed remotely from one another. If the bridge feature is not enabled for the port, the inputs are combinatorial.

Address Mapping Controller 420—Address mapping controller 420 performs address mapping and determines the destination bus device for a given transaction. Address mapping controller 420 module performs this mapping for all ports in parallel. In addition, address mapping controller 420 translates received physical memory addresses to local memory addresses within the corresponding bus device. Address mapping controller 420 translates and routes memory request, I/O requests, and machine specific register (MSR) requests differently.

Address mapping controller 420 performs speculative address mapping. To do this, address mapping controller 420 uses the descriptor of the last access for each port as a guess for the incoming request. If address mapping controller 420 guesses incorrectly, the guess is updated and in the next cycle the address is mapped correctly. The speculative mapping is correct about 99% of the time and allows address mapping controller 420 to perform mapping in parallel with arbitration. Advantageously, the pipeline depth is reduced from two stages to one.

Arbitration Controller 425—Arbitration controller 425 arbitrates all request packets for bus IF unit 170. Arbitration controller 425 receives the destination, transaction type and priority of each port request. In addition, arbitration controller 425 receives inputs from write data arbitration controller 430 in order to monitor the number of outstanding write data and responses. The primary outputs of, arbitration controller 425 are a plurality of Arbitration Select signals. These signals notify request-out stage 440 which port has been arbitrated. Arbitration controller 425 can arbitrate one request per clock cycle.

Arbitration controller 425 performs a series of pre-arbitration checks to determine if a request from a port is a candidate for arbitration. The following pre-arbitration checks are performed:

1) Not ready check—This check determines if the port has a valid request and if its destination request output buffer is available.
2) Priority check—This check determines if the priority level of the port request is equal to the maximum priority level of all the ports.
3) Isochronous (ISOC) check—This check determines if the priority level is time-slice and whether this port is the SID of current time-slice.
4) Change of flow check—If the destination of the port request is not the current destination of the port, this check determines if there are any outstanding transaction on the data buses.

The vector of all the pre-arbitrated requests is then round-robin arbitrated. If there is an isochronous request (priority level (PRI)=4) and the port SID is not the current time-slice, the request is internally changed into a PRI=3 request. If there is an isochronous request, arbitration controller 425 prevents multiple isochronous requests from being arbitrated during that time-slice.

Arbitration by arbitration controller 425 is contingent on guessing for the destination and address mapping performed by address mapping controller 420. If a guess is not correct for the arbitrated port, the arbitration is killed and a dead cycle occurs. The guess is corrected for the next cycle and the arbitration is allowed to occur.

Arbitration controller 425 uses master requests on Port 0 device 450 to arbitrate the internally buffered coherent requests. Arbitration controller 425 maintains an arbitration machine specific register (ARE MSR) to control the arbitration algorithm. These controls can be used for debug purposes and to control the bandwidth allocations for isochronous devices. Arbitration controller 425 sends write data arbitration controller 430 a bus request describing the request arbitration. This includes the SID, DID (destination ID), type and size of the arbitrated transaction.

Request-Out Stage 440—Request-out stage 440 takes in all the incoming requests and multiplexes the requests to create the output request. The multiplexing is driven by Arbitration Select signals from arbitration controller 425. Request-out stage 440 manages the output buffers for each output port. If a buffer is available or will be available in the next cycle, request-out stage 440 asserts the take signal to arbitration controller 425 to allow arbitration to the port.

Data-in Buffer 410—Data-in buffer 410 buffers the incoming Data In packets. In one embodiment of the present invention, there is a one clock delay between the transmission of a packet and the acknowledgment of its receipt. To operate with this delay. Data-in Buffer 410 provides and manages a one-deep buffer for each data-in port.

Data-in buffer 410 replaces the SID field on write data packets with the actual port ID. In addition, data-in buffer 410 replaces the destination identification (DID) field on response packets. In addition, if the bridge feature is enabled for the port, registered inputs are implemented . . . This provides a full cycle when crossing bus IF units 170. If the bridge feature is not enabled for the port, the inputs are combinatorial. If the bridge feature is enabled for a port, data-in buffer 410 must perform SID remapping. Data-in buffer 410 maintains a list and count of all outstanding transaction responses and the corresponding SID and PID fields. When a response appears on data-in buffer 410, the SID field is determined by SID=f(PID, DATATYPE), where the returned SID field is the SID field of the oldest outstanding transaction with that PID and DATATYPE field.

Write Data Arbitration Controller 430—Write data arbitration controller 430 arbitrates all bus IF unit 170 write data packets and response packets. According to an advantageous embodiment of the present invention, write data arbitration controller 430 may arbitrate up to two packets per clock cycle. Write data arbitration controller 430 maintains counters for arbitrated non-coherent write data, coherent write data and responses. The zero values of these counters are used to determine when a master bus device 210 may change flow and to prevent acceptance of premature data. Write data arbitration controller 430 receives the arbitrated packets from arbitration controller 425 describing the SID field, DID field, size and type of each arbitrated request.

Write data arbitration controller 430 receives the data type from data-in buffer 410. The destination of the packets is determined by the current write destination register in write data arbitration controller 430 for write data or the packet BID for response packets. The requests are pre-arbitrated to determine which packets are candidates for arbitration. Write data arbitration controller 430 performs a check to determine if a packet is a write data packet and if the write data buffer for its destination port is available. Write data arbitration controller 430 also performs a check to determine if a packet is a response packet. The pre-arbitrated packets are then priority arbitrated starting at Port 1. The first packet is arbitrated based on the priority encoding of the pre-arbitrated requests. The send packet is arbitrated based on a priority encoding of all the requests besides the first arbitrated port. The primary outputs of the write data arbitration controller 430 are Data Arbitration Select signals.

Data-Out Stage 445—Data-out stage 445 receives all incoming data packets and the Data Arbitration Select signals from write data arbitration controller 430. Data-out stage 445 then multiplexes the results to two internal output buses. These two buses are then routed to each of the output buffers for each port. Each port manages a skid buffer and the actual output buffer. The skid buffer allows data-out stage 445 to place response data on the bus when write data is stalled at the output port.

Port 0 device 450—Port 0 device 450 is the bus device on Port 0. Port 0 device 450 implements the bus IF unit 170 master/slave protocol and accepts all. Port 0 requests and transactions. Port 0 device 450 accepts the following request types:

1) MSR Write—Routes machine specific register (MSR) requests to an internal MSR for bus IF unit 170;
2) MSR Read—Reads internal MSRs for bus IP unit 170;
3) Other valid types—Responds with the correct number of packets and may assert SSMI or SERR.

Port 0 device 450 sends an internal decoded MSR read and MSR write bus to all the modules in bus IF unit 170.

In addition. Port 0 device 450 watches the activity of all the modules in bus IF unit 170 and implements the power management is control logic and MSRs. Port 0 device 450 sends Busy Early and Bus Late signals to clock control module 460. Port & device 450 module also internally buffers coherent requests. When Port 0 device 450 sees a coherent response (write-back or a clean snoop response), it promotes the coherent request into a PRI=7 request and masters the request on Port 0 to guarantee that it is arbitrated next and changes the type to a non-coherent transaction.

Port 0 device 450 also implements the debug features for bus IF unit 170. The transaction comparators assert the AERR signal when a transaction hits the comparators. If transactions are mastered from a port with the debug feature enabled, Port 0 device 450 masters debug transactions to echo the packets. Port 0 device 450 also implements the diagnostic bus for assertions of internal conditions.

Clock Control Module 460—Clock control module 460 is a shared common module that performs the clock gating control for bus IF unit 170. Clock control module 460 receives the Busy Early and Busy Late signals from Port 0 device 450 and the power management MSRs of bus IF unit 170 and controls the clock gating.

Machine specific register (MSR) cycles are performed using MSR Read Request and MSR Write Request. The MSR address (MSRAD) is used to route the MSR request to the destination device. In a bus topology according to the principles of the present invention, MSR routing is topology independent. Bus IF unit 170 does not use address maps to determine the destination of the MSR request. Instead, the destination is determined from the most-significant bits of the MSRAD.

According to an exemplary embodiment of the present invention, a MSR address comprises 32 bits, represented as MSRAD[31:0]. The fourteen least significant bits, MSRAD [13:0] are the MSR address within the target bus device itself. Thus each bus device may contain up to $(2)^{14}$ machine specific registers that may be accessed by other devices. The 18 most-significant bits of the MSR address, MSRAD. [31:14], are divided into six 3-bit routing fields (or octets) in the format MSRAD[31:14]=[3.3.3.3.3.3]. The three most-significant bits (octet), MSRAD[31:29], specify the port ID that the transaction must travel through.

According to an advantageous embodiment of the present invention, when an MSR request passes through bus IF unit 170, the most-significant octet of the MSRAD is removed, the remaining five octets are left shifted three places, and the least-significant octet is filled with the binary value 000. When a bus device receives an MSR request with MSRAD [31:14]=[0.0.0.0.0.0] (i.e., all octets equal to [000] binary), the MSR transaction has reached its destination. Since MSR addresses are self-routing from the master bus device, the addresses are master-dependent. This enables each bus device to access any other bus device without having to set up any address maps in the system.

Figure 5:
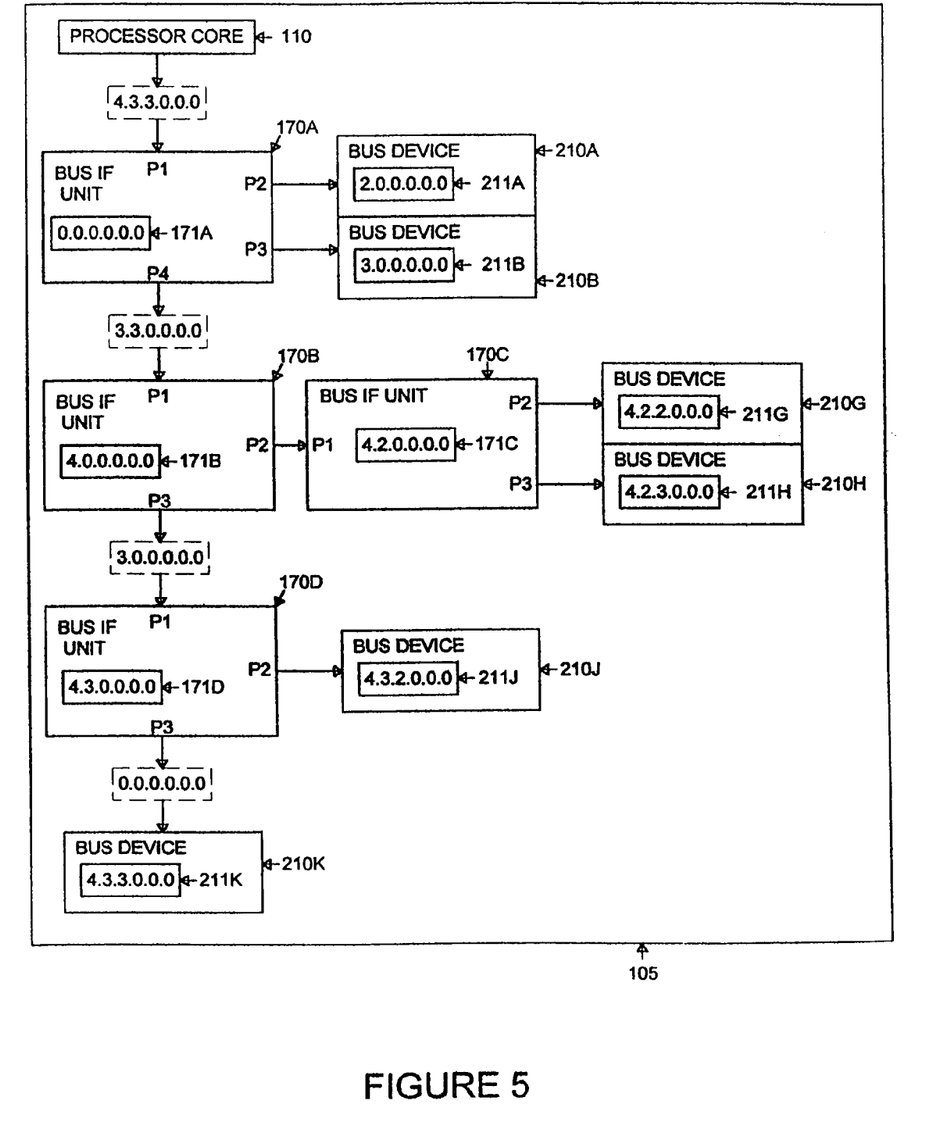
FIG. 5 illustrates the hierarchical addressing scheme for machine specific register (MSR) requests in a plurality of bus IF units according to the principles of the present invention.
Figure 6:
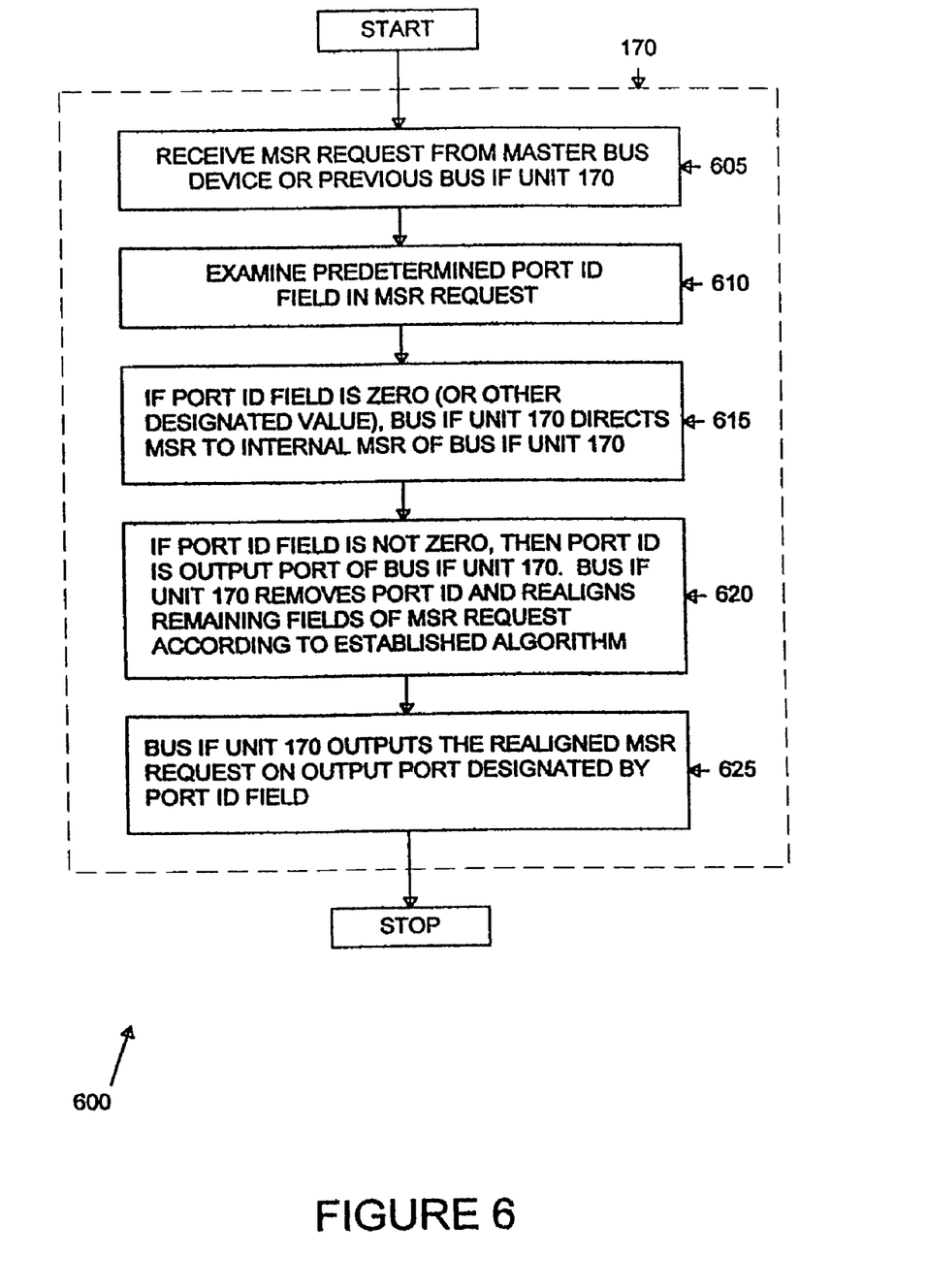
FIG. 6 is a flow diagram illustrating the processing of an MSR request by an exemplary bus IF unit according to the principles of the present invention.

FIG. 5 illustrates the hierarchical addressing scheme for machine specific register (MSR) requests in a plurality of bus IF units 170 according to the principles of the present invention. FIG. 6 depicts flow diagram 600, which illustrates the processing of an MSR request by exemplary bus IF unit 170 according to the principles of the present invention. Initially, bus IF unit 170 receives a MSR request from master bus device 210 or previous bus IF unit 170 (process step 605). Address mapping controller 420 then examines the predetermined port ID field in the MSR request (process step 610). According to an advantageous embodiment of the present invention, the predetermined port ID field comprises the three most significant bits of the MSR address, namely MSR [31:29].

If address mapping controller 420 determines that the port ID field is zero (or another designated value), bus IF unit 170 directs the MSR request to an internal MSR of bus IF unit 170 (process step 615). If an MSR write is being executed, the MSR data accompanying the MSR address is then written to the targeted MSR register specified in MSRAD [13:0]. If address mapping controller 420 determines that the port ID field is not zero, then the value in the port ID field is the output port of bus IF unit 170. Address mapping controller 420 then removes the port ID value from SMRAD [31:14] and realigns the remaining fields of MSR request according to an established algorithm (process step 520). According to an advantageous embodiment of the present invention, the, the established algorithm means that the remaining five octets are left-shifted three places, and the least-significant octet is filled with the binary value 000. Finally, bus IF unit 170 outputs the realigned MSR request on the output port designated by the port ID field (process step 625).

Those skilled in art will understand that the size of the port ID field and the size of the MSR address(MSRAD[13:0]) are by way of example only and that other sizes may easily be used. For example, in an alternate embodiment of the present invention, MSRAD[15:0] may be used to identify up to $(2)^{16}$ MSR addresses within a bus device and MSRAD[31:16] may comprise four fields, each of which contains a 4-bit hexadecimal value, such as MSRAD [31:16]=[5.2.E.C].

Those skilled in art also will understand that the realignment algorithm may also be modified. For example, the port ID field may be contained in the three least significant bits, MSRAD[2:0] and MSRAD[31:14] may be right-shifted three places after the port ID field is examined. In still other embodiments, the octets in MSRAD. [31:14] may be swapped or realigned according to any user-selected criteria. Furthermore, a non-zero value in the port ID field may be used to determine that the MSR request has reached its final destination. For example, a port ID value of 111 (binary) may be used to designate that the MSR request is directed to an internal MSR of bus IF unit 170 or the targeted bus device.

Returning now to FIG. 5, a specific example of the MSR addressing scheme is illustrated. Processor core 110 issues a MSR request in which MSRAD[31:14] are equal to the octal values [4.3.3.0.0.0]. An MSR request may be issued by processor core 110 to bus devices 210A and 210B via bus IF unit 170A. An MSR request may be issued by processor core 110 to bus devices 210G and 210H via bus IF units 170A, 170B, and 10C. An MSR request may be issued by processor core 110 to bus devices 210J and 210 K via bus IF units 170A, 170B, 170D.

Within each bus device 210, routing bits 211 of MSRAD [31:14]used by core processor 110 to address a machine specific register within that bus device 210 are shown. For example, the routing bits 211 A of bus device 210A are MSRAD [31:14]. [2.0.0.0.0.0], the routing bits 211H of bus device 210H are MSRAD[31:14]=[4.2.3.0.0.0], and so forth. Similarly, within each bus IF unit 170, routing bits 171 of MSRAD [31:14]used by core processor 110 to address a machine specific register within that bus IF unit 170 are shown. For example, the routing bits 171A of bus IF unit 170A are MSRAD[31:14]=[0.0.0.0.0.0], the routing bits 171C of bus IF unit 170C are MSRAD[31:14]=[4.2.0.0.0.0].

Thus, the MSR request in which MSRAD[31:14]= [4.3.3.0.0.0] is being directed to bus device 210K. When bus IF unit 170A receives the MSR request, bus IF unit 170A determines that the three most significant bits (i.e., the port ID field), MSRAD. [31:29], are equal to 4, not 0. In response, bus IF unit 170A left-shifts the remaining routing bits three places and inserts 000 (binary) into the three least significant bits. The left-shifted routing bits, MSRAD[31:14]=[3.3.0.0.0.0], are then transferred out on port 4 (P4), which was identified by the value 4 in initial port ID field.

Next, when bus IF unit 170B receives the MSR request from port 4 of bus IF unit 170A, bus IF unit 170B determines that the three most significant bits (i.e., the port ID field), MSRAD[31:29], are equal to 3, not 0. In response, bus IF unit 170B left-shifts the remaining routing bits three places and inserts 000 (binary) into the three least significant bits. The left-shifted routing bits, MSRAD. [31:14]=[3.0.0.0.0.0], are then transferred out on port 3 (P3), which was identified by the value 3 in the port ID field.

When bus IF unit 170D receives the MSR request from port 3 of bus IF unit 170B, bus IF unit 170D determines that the three most significant bits (i.e., the port ID field), MSRAD [31:29], are equal to 3, not 0. In response, bus IF unit 170D left-shifts the remaining routing bits three places and inserts 000 (binary) into the three least significant bits. The left-shifted routing bits, MSRAD[31:14]=[0.0.0.0.0.0], are then transferred out on port 3. (P3), which was identified by the value 3 in the port ID field.

Finally, when bus device 210K receives the MSR request from port 3 of bus IF unit 170D, bus device 210K examines the MSR address bits, MSRAD[13:0] (not shown) to determine which machine specific register in bus device 210K is being accessed. Data is then written to or read from the accessed machine specific register.

Figure 7:
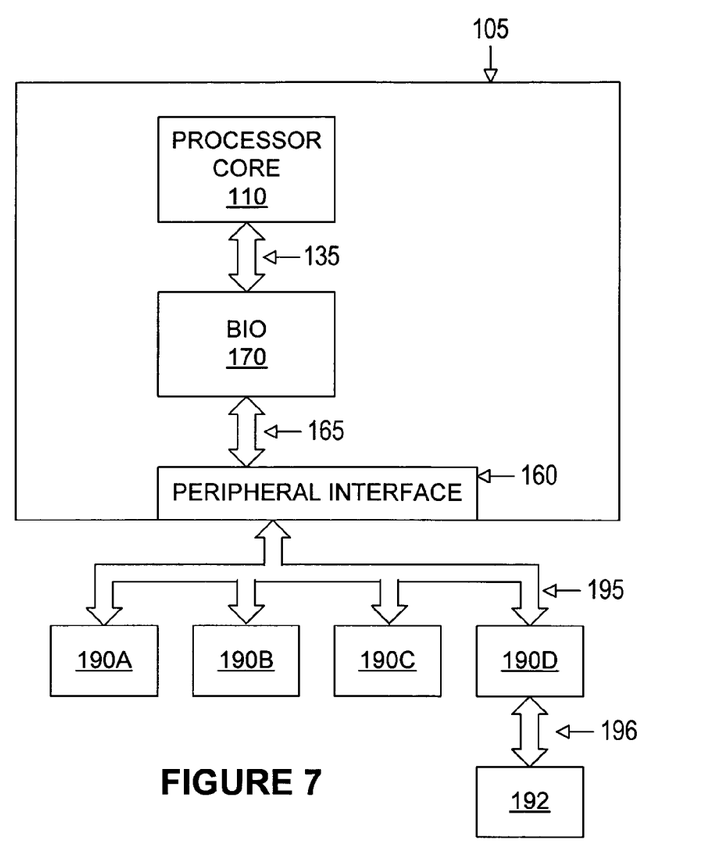
FIG. 7 illustrates, in block diagram form, a portion of the system of FIG. 1 and a plurality of external devices.
Figure 8:
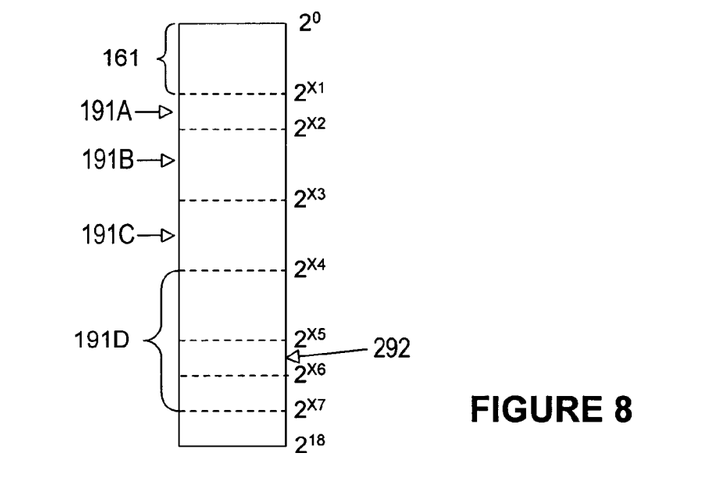
FIG. 8 illustrates a machine specific register memory map related to the system of FIG. 7.
Figure 9:
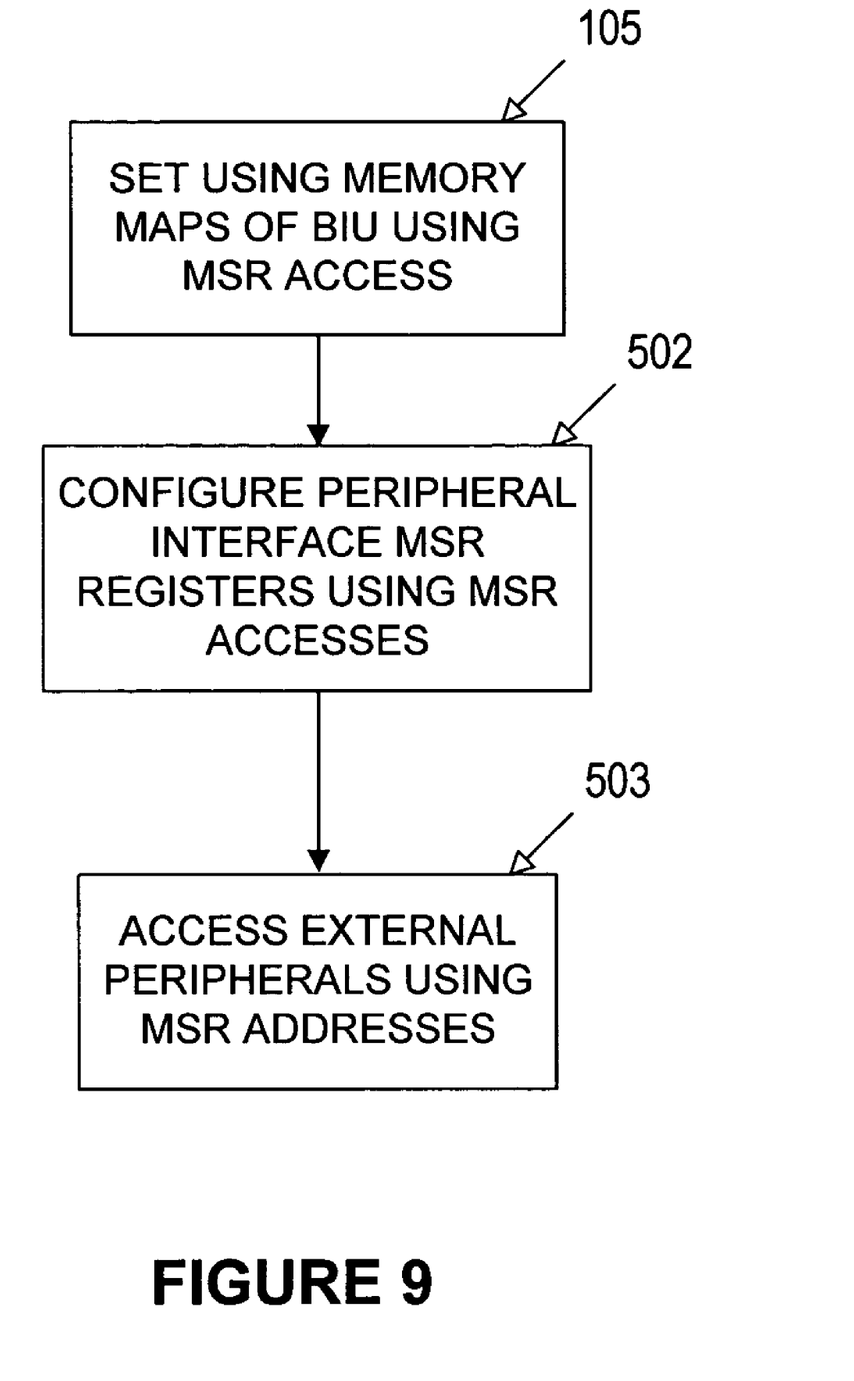
FIG. 9 illustrates, in flow diagram form, a method in accordance with a specific embodiment of the present invention.

FIGS. 7–9 herein describe a specific use of MSR access commands with the system. In the embodiment described, MSR access commands are executed by the processor core 110, to access MSR memory space residing in internal and external peripherals. The MSR memory space, which is typically confined to an internal bus accessible by a processor core, can access internal peripheral devices, such as the bus interface unit 170, and external devices 190. This is further illustrated and described with reference to FIGS. 7–9.

FIG. 7 illustrates for purposes of discussion a portion of the system on a chip 105 of FIG. 1. The portion illustrated in FIG. 7 includes the processor core module 110, the bus interface unit 170, and the peripheral interface module 160. For purposes of discussion, the processor core 110 is coupled to the bus interface unit 170 through bus 135, while the bus interface unit 170 is coupled to the peripheral interface module 160 through bus 165. It will be appreciated, that the busses 135 and 165 are, in one embodiment, of the type described previously herein . . .

The peripheral interface module 160 includes an external bus port comprising a plurality of nodes that are to be connected to an external bus. Typically, the plurality of nodes will include address nodes, data nodes, and control nodes. It will be appreciated, that the peripheral interface module 160 can support a single external bus port, or a plurality of external bus ports. For purposes of discussion, a single external bus port is discussed.

The external bus port can be a multiplexed bus, whereby data and address data are transmitted using common, multiplexed, nodes. In another embodiment, the external bus port can support non-multiplexed bus architectures where the data and address information are provided to separate data node and address data nodes. It will further be appreciated, that the various data and address nodes of the external port can be bi-directional or unidirectional. For example, a set of nodes supporting data transfer associated with bus 195 can support bi-directional transfers between the external peripherals 190a–190d, or they can support unidirectional transfers. Typically, the number of nodes required to support unidirectional transfers would require twice as many nodes as those requiring bi-directional transfers.

FIG. 8 illustrates, for purposes of discussion, a memory map of the MSR memory space. For purposes of discussion, the memory map portion 161, residing between address location $2^0$ and $2^{x1}$, represent MSR memory space associated with internal devices of the system on a chip 105. For example, within the memory space 161, a portion of the address space can correspond to registers within processor core 110, while another portion of the address space corresponds to the bus interface unit 170. Yet another portion of memory region 161 corresponds to the peripheral interface portion 160.

MSR memory map locations 191A–191D represent MSR memory space associated with external devices 190A–190D, respectively. It will be appreciated, that the memory map location 191D illustrated in FIG. 8 further includes a subset of memory 292 that corresponds to MSR memory corresponding to the external peripheral device 192, which is accessed through external device 190D. The use of MSR access commands to access external devices is better understood with reference to the method of FIG. 9

FIG. 9 illustrates, in flow diagram form, a method in accordance with the present invention. In step 501, MSR accesses are used to set the memory maps of the bus interface unit 170. It will be appreciated, that the term "MSR accesses" refers specifically to MSR read and MSR write operations. MSR read operations are initiated by MSR read commands (RDMSR) as are well known with respect to Pentium class devices, such as are available by Intel Corporation. Another MSR access command is the MSR write command (WRMSR). With respect to FIG. 7, the MSR memory map locations can be accessed (read or write) using MSR commands to initiate MSR access requests via bus 135 between the processor core 110 and the bus interface unit 170. In one embodiment, the MSR access requests across bus 135 will provide an MSR routing field as previously described, identifying the bus interface unit 170 as the target peripheral. In addition, the MSR access request information will include a destination address and destination data (for an MSR write) that will be provided to the bus interface unit 170 to select and configure specific register or memory locations.

In one embodiment, the destination addresses and data are used to set up address mapping translation descriptors . . . Examples of specific address mapping transcriptors include MSR address mapping transcriptors that identify how to memory map the $2^{14}$ bits of available MSR space as defined herein. Other transcriptor examples include 10 address mapping transcriptors, and address mapping transcriptors for memory space accesses. It will be appreciated, that the term "IO access" correlates to those commands of the Pentium programming model that access IO space, while memory space accesses refer to those commands of the Pentium programming model that access memory address space.

In an alternate embodiment, which can be used along with specific address mapping transcriptors, the bus/interface unit 170 can use address masks to block out specific address ranges with respect to IO accesses, memory accesses, or MSR accesses. A particular use of an address mask would be to provide an IO address mask and a memory mask to specifically prohibit the use of an IO access, or memory accesses, to access a physical location that is mapped to the MSR address space. In this manner, the hardware implementation of a system such as that illustrated in FIG. 7, can be simplified, in that the bus interface unit 170 can prohibit memory and IO accesses to those address locations of external devices 190A–190D that correspond to MSR memory space. This is an advantage over prior art systems that require external logic to prohibit such accesses.

At step 502, MSR accesses are used to configure the peripheral interface module 160. The peripheral interface module 160 can contain its own register sets used to implement memory mapping, address masking, as well as provide other information that may be pertinent to accessing one or more of the external devices 190a–190d. It will be appreciated, that the step 502 may be an optional step if the peripheral interface module 160 is very application specific. However, typically, the peripheral interface module 160 itself would be programmable in order to support a broad range of external devices and applications.

At step 503, an MSR access is performed to configure, or provide data, to external peripherals 190A–190D. This would be typically accomplished by executing an MSR access command at the processor core 110 that provides for an access request having an MSR routing field associated with the targeted peripheral. For example, the MSR routing field could identify the peripheral interface 160. As a result, the MSR access will proceed across bus 135 from the processor core 110 to the bus interface unit 170. Upon receiving the access request, the bus interface unit 170 will pass the request, with a modified MSR routing field, to bus 175 and on to the peripheral interface 160. The peripheral interface 160, after recognizing via examination of the MSR routing field that the current access request is to be processed by itself, will retrieve the destination data and destination address information from the bus 165.

The peripheral interface 160 can perform an address mapping of the destination address information, or it can provide the destination address directly to its external bus port connected to the bus 195. Based upon the address on bus 195, one or more of the external devices 190A–190D will be accessed. It will be appreciated that the peripheral interface module 160 will also provide appropriate control information needed to access external devices 190A–190D. In response to an external device recognizing the access request from the peripheral interface 160, the destination data will be provided to the external device. The external device may in turn, dependent on the data received, access subsequent external devices, such as device 192 by device 190D. In this manner, MSR accesses to external devices are readily accomplished.

It will be further appreciated, that for a specific MSR access command executed by the processor core 110, that there will be an internet connect path extending from the processor core 110 to the device being accesses that provides the MSR data. In one embodiment, the interconnect path will start at the processor core 110 and include at least portions of the bus 135, and bus interface unit 170. In another embodiment, where the MSR access command is accessing an external device such as device 190C, the interconnect path will extend from the processor core 110I through the bus 135, through the bus interface unit 170, through the bus 165, to the peripheral interface module 160, through the external bus 195, and through a portion of the external device 190C. It will be appreciated also, that this is different from the prior art, which would not support specific interconnect paths from the processor core to internal and external peripheral devices in response to a MSR access command being executed by the core 110.

Although the present invention has been described in detail, those skilled in the art should understand that they can make various changes, substitutions and alterations herein without departing from the spirit and scope of the invention in its broadest form.

It will be appreciated that the description herein is illustrative and not meant to be limiting. It will be further appreciated that many variations are possible. For example, while MSR write operations have been primarily described, MSR read operations are also anticipated.

What is claimed is:

1. A method comprising:
   executing at a processor core module of a system on a chip (SOC) a first MSR access command, the first MSR access command comprising a first destination address and a first destination data; and
   providing, in response to executing the first MSR access command, a first access request to an external bus port to access an external device, the first access request including the first destination address and the first destination data and the external device being external the SOC.

2. The method of claim 1 further comprising:
   providing, in response to executing the first MSR access command, a second access request including the first destination address and the first destination data to a bus interface module, wherein the bus interface module is part of the SOC; and
   wherein providing the first access request is fiber based on providing the second access request to the bus interface module.

3. The method of claim 2, further comprising:
   providing, in response to providing the second access request, a third access request including the first destination address and the first destination data to a peripheral interface module, wherein the peripheral interface module is part of the SOC; and
   wherein providing the first access request to the external bus port further comprises the peripheral interface module providing the first access request.

4. The method of claim 3, wherein the second access request includes providing the second access request to a first bus coupling the processor core module to the bus interface module and wherein the third access request includes providing the third access request to a second bus coupling the bus interface module to the peripheral interface module.

5. The method of claim 3 further comprising:
   executing at the processor core a set of MSR access commands, the set of MSR access commands comprising one or more MSR access commands; and
   configuring, in response to executing the set of MSR access command, at least a portion of the bus interface unit.

6. The method of claim 5 wherein configuring further comprises address information to prevent a memory location associated with the first destination address from being accessed in response to a memory access command.

7. The method of claim 6, wherein the address information comprises address mapping information.

8. The method of claim 6, wherein the address information comprises address masking information.

9. The method of claim 6 wherein configuring further comprises defining the memory map to prevent the memory location associated with the first destination address from being accessed in response to an IO access command.

10. The method of claim 5 wherein configuring further comprises defining a memory map to prevent a memory location associated with the first destination address from being accessed in response to an IO access command.

11. The method of claim 1, wherein providing the first access request to the external bus port further comprises a peripheral interface module providing the first access request.

12. The method of claim 1 further comprising:
    accessing a first external peripheral when the first destination address has a first value; and
    accessing a second external peripheral when the first destination address has a second value.

13. A system comprising:
    a processor core portion to decode an MSR write command;
    a first interconnect path to provide an address associated with the MSR write command from the processor core to a first external port; and
    a second interconnect path to provide data associated with the MSR write command from the processor core to a second external port.

14. The system of claim 13 further comprising:
    the processor core portion to decode an MSR read command;
    a third interconnect path to provide an address associated with the MSR read command from the processor core to a third external port; and
    a fourth interconnect path to provide data associated with the MSR write command to the processor core from a fourth external port.

15. The system of claim 14, wherein the second external port and the fourth external port are the same port.

16. The system of claim 15, wherein the first external port and the third external port are the same port.

17. The system of claim 16, wherein the first external port and the second external port at are mutually exclusive.

18. The system of claim 16, wherein the first external port and the second external port comprise common output nodes.

19. The system of claim 14 wherein the first external device is coupled to the third external port and the fourth external port.

20. The system of claim 13 further comprising:
a bus interface unit comprising a first portion of the first interconnect path and a first portion of the second interconnect path.

21. The system of claim 20 further comprising:
a peripheral interface module comprising a second portion of the first interconnect path and a second portion of the second interconnect path.

22. The system of claim 13 further comprising:
a first external device coupled to the first external port and the second external port.

23. The system of claim 21 further comprising:
a second external device coupled to the first external port and the second external port.

24. A system comprising:
a means for executing at a first MSR access command, the first MSR access command comprising a first destination address and a first destination data; and
a means for providing, in response to executing the first MSR access command, a first access request to an external bus port to access an external device, the first access request including the first destination address and the first destination data and the external device being external the SOC.

* * * * *